(12) United States Patent
Wang et al.

(10) Patent No.: US 9,250,736 B2
(45) Date of Patent: Feb. 2, 2016

(54) CAPACITIVE INCELL TOUCH PANEL AND DISPLAY APPARATUS

(71) Applicant: BEIJING BOE OPTOELECTRONICS TECHNOLOGY CO., LTD., Beijing (CN)

(72) Inventors: Haisheng Wang, Beijing (CN); Xue Dong, Beijing (CN); Xiaoliang Ding, Beijing (CN); Hongjuan Liu, Beijing (CN); Shengji Yang, Beijing (CN); Weijie Zhao, Beijing (CN); Yingming Liu, Beijing (CN); Tao Ren, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 127 days.

(21) Appl. No.: 14/063,216

(22) Filed: Oct. 25, 2013

(65) Prior Publication Data
US 2014/0118299 A1    May 1, 2014

(30) Foreign Application Priority Data
Oct. 26, 2012  (CN) .......................... 2012 1 0418804

(51) Int. Cl.
*G06F 3/041* (2006.01)
*G06F 3/044* (2006.01)
*G09G 3/36* (2006.01)

(52) U.S. Cl.
CPC .............. *G06F 3/0412* (2013.01); *G06F 3/044* (2013.01); *G06F 3/0416* (2013.01); *G09G 3/3648* (2013.01)

(58) Field of Classification Search
CPC ..... G06F 3/0412; G06F 3/044; G06F 3/0416; G06F 2203/04111
See application file for complete search history.

(56) References Cited

U.S. PATENT DOCUMENTS

| 6,140,990 | A * | 10/2000 | Schlig .............................. 345/92 |
| 6,320,639 | B1 * | 11/2001 | Mori et al. ..................... 349/155 |
| 8,451,244 | B2 * | 5/2013 | Hotelling et al. ............. 345/173 |
| 2008/0079680 | A1 * | 4/2008 | Fujita ............................ 345/89 |
| 2010/0194699 | A1 * | 8/2010 | Chang ........................... 345/173 |
| 2011/0211145 | A1 * | 9/2011 | Tsuruma et al. .............. 349/106 |
| 2012/0105337 | A1 * | 5/2012 | Jun et al. ....................... 345/173 |
| 2012/0113027 | A1 * | 5/2012 | Song et al. .................... 345/173 |
| 2012/0162089 | A1 * | 6/2012 | Chang ........................... 345/173 |
| 2012/0162584 | A1 * | 6/2012 | Chang et al. .................. 349/106 |
| 2012/0249444 | A1 * | 10/2012 | Lee et al. ...................... 345/173 |
| 2014/0353691 | A1 * | 12/2014 | Lee ................................. 257/88 |

* cited by examiner

*Primary Examiner* — Sanjiv D Patel
(74) *Attorney, Agent, or Firm* — Ladas & Parry LLP

(57) ABSTRACT

The present disclosure provides a capacitive in-cell touch panel and a display apparatus, wherein touch sensing electrodes are set on a color filter substrate, a common electrode layer connected as a whole plane on a TFT array substrate is divided into strips to be used as touch driving electrodes, and metal driving electrodes directly electrically connected to the corresponding touch driving electrodes are set on the TFT array substrate so as to reduce resistance of the touch driving electrodes. The embodiments of the disclosure can save the production cost and improve the production efficiency. Moreover, the touch function and the display function are driven in a time division manner, and thus the production cost can be further reduced, and the picture quality and touch accuracy can be enhanced.

14 Claims, 10 Drawing Sheets

CAPACITIVE INCELL TOUCH PANEL AND DISPLAY APPARATUS

CROSS REFERENCE TO RELATED APPLICATIONS

This application claims priority from Chinese National Application No. 201210418804.4 filed on Oct. 26, 2012, the contents of which are incorporated herein by reference.

TECHNICAL FIELD OF THE DISCLOSURE

The present disclosure relates to a technical field of display, and particularly to a capacitive In-Cell touch panel and a display apparatus.

BACKGROUND

With fast development of display technology, touch panels have been widely used in human life. At present, touch panels can be divided, in terms of structure, into Add-on mode touch panel, On-Cell touch panel and In-Cell touch panel. The Add-on mode touch panel is formed by manufacturing a touch panel and a liquid crystal display (LCD) screen separately and bonding them together to be a liquid crystal display screen with a touch function, so the Add-on mode touch panel has disadvantages of higher cost, lower light transmission rate, thicker modules, etc. The In-Cell touch panel is formed by embedding touch electrodes of a touch panel inside a liquid crystal display screen, so in the in-cell touch panel, the thickness of module can be reduced and the production cost of the touch panel can also be largely reduced, and thus the in-cell touch panel is a favorite choice for various panel manufactories.

At present, an existing capacitive in-cell touch panel is implemented by adding additional touch scanning lines and touch sensing lines directly on an existing thin film transistor (TFT) array substrate, that is, two layers of Indium Tin Oxide (ITO) strip electrodes are manufactured on the surface of the TFT array substrate which are in two different planes, wherein the Indium Tin Oxide strip electrodes on one layer cross those on the other layer. The two layers of indium tin oxide strip electrodes are used as the touch driving lines and the touch sensing lines respectively, and an induction capacitor is formed on each point at which the two layers of ITO strip electrodes intersect in different planes. An operational process of the capacitive in-cell touch panel includes detecting a voltage signal coupled across the induction capacitor through a touch sensing line when a touch driving signal is applied on an ITO strip electrode as the touch driving line; during such a process, when a human body touches the touch panel, an electrical filed of the human body will affect the induction capacitor, such that the capacitance of the capacitor will change and in turn the voltage signal coupled through the touch sensing line will change, so the position of a touch point can be determined according to variation of the voltage signal.

In the structure of the above capacitive in-cell touch panel, a new film layer is added on the existing TFT array substrate, such that the structure of the resultant TFT array substrate is relative complicated, since a new process is incorporated in the manufacture of the TFT array substrate, the production cost increases. In addition, in the structure of the above capacitive in-cell touch panel, two driving chips (IC) are simultaneously adopted for implementing touch driving and display driving respectively, so the production cost is also higher.

SUMMARY

Embodiments of the present disclosure provide a capacitive in-cell touch panel and a display apparatus for implementing a capacitive in-cell touch panel with a lower cost.

According to an aspect of the present disclosure, a capacitive in-cell touch panel includes: a color filter substrate, a thin film transistor (TFT) array substrate having a common electrode layer, and a liquid crystal layer between the color filter substrate and the TFT array substrate, wherein a plurality of pixel units being arranged in a matrix are set on the TFT array substrate;

the color filter substrate has a plurality of touch sensing electrodes, each of which is extended along the direction of columns of the pixel units;

the common electrode layer of the TFT array substrate has a plurality of touch driving electrodes, each of which is extended along the direction of rows of the pixel units; during the display period of a frame of picture, each of the touch driving electrodes is used to transmit common electrode signals and touch scanning signals in a time division manner;

the TFT array substrate has a plurality of metal driving electrodes, each of which is extended along the direction of rows of the pixel units; each of the metal driving electrodes is located in a gap between adjacent pixel units and is directly electrically connected to a corresponding touch driving electrode.

According to another aspect of the present disclosure, a display apparatus includes the above capacitive in-cell touch panel.

With the above capacitive in-cell touch panel and the above display apparatus, the touch sensing electrodes are set on the color filter substrate, the common electrode layer connected as a whole plane on the TFT array substrate is divided into strips to be used as touch driving electrodes and the metal driving electrodes directly electrically connected to the corresponding touch driving electrodes are set on the TFT array substrate so as to reduce resistance of the touch driving electrodes, and the touch driving electrodes are driven in the time division manner, so that the touch function and the display function are implemented. In the touch panel provided in the embodiment of the present disclosure, since the common electrode layer of the TFT array substrate is modified to form touch driving electrodes, no additional process is added on the basis of the existing TFT array substrate preparation process, and thus the production cost is saved and the production efficiency is improved. Moreover, since the touch function and the display function are driven in the time division manner, on one hand, the chip for implementing the display driving and the chip for implementing the touch driving can be integrated together, so that the production cost can be further reduced; on the other hand, the time division driving of the touch function and the display function can also reduce the interference between the display function and the touch function, so that picture quality and touch accuracy can be enhanced.

In addition, since the touch driving electrodes play a role of the common electrode layer during the display period, the respective touch driving electrodes are commonly prepared by materials having a higher resistance such as ITO or IZO. In the touch panel provided in the embodiment of the present disclosure, in order to reduce the resistance of the respective touch driving electrodes, the plurality of metal driving electrodes directly electrically connected with the respective touch driving electrodes are set in the TFT array substrate, so that the resistance of the touch driving electrodes are largely reduced. Since such metal driving electrodes are located

DETAILED DESCRIPTION

At present, the liquid crystal display technology capable of achieving a wide view-angle mainly includes an In-Plane Switch (IPS) technology and an Advanced Super Dimension Switch (ADS) technology. The ADS technology makes the liquid crystal molecules with any orientation within and above the slit electrodes in the liquid crystal cell rotate by forming a multi-dimension electric field through an electric field generated by edges of the slit electrodes in a same plane and an electric field generated between a layer of the slit electrodes and a layer of plate electrodes, so that the operational efficiency of the liquid crystal molecules and the light transmission rate can be improved. The ADS technology can also improve the picture quality of a TFT-LCD product, and has advantages of high definition, high light transmission rate, low power consumption, wide view-angle, high aperture ratio, low chromatic aberration, and without push Mura, etc.

In the embodiment of the present disclosure, a new capacitive in-cell touch panel structure is proposed based on the traditional ADS technology and a high aperture ratio advanced super dimension switch (H-ADS) technology as an important improvement of the traditional ADS technology.

Detail description will be given below to particular implementations of the capacitive in-cell touch panel and the display apparatus provided in the embodiments of the present disclosure with reference to the accompanying drawings.

In the accompanying drawings, width and shape of respective thin films do not reflect the real scale of the TFT array substrate or the color filter substrate and are only for the purpose of schematically illustrating the embodiment of the present disclosure.

Figure 1:
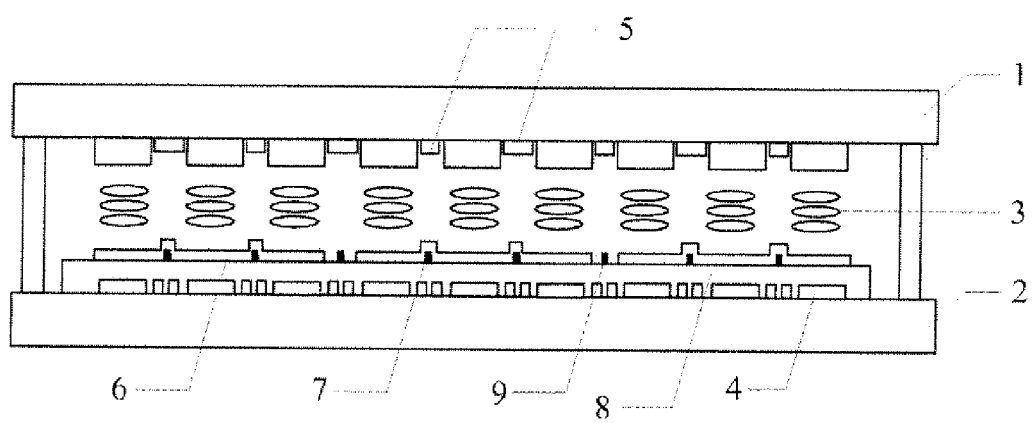
FIG. 1 is a schematic structure diagram of a capacitive in-cell touch panel provided in the embodiment of the present disclosure.

FIG. 1 shows a schematic diagram of the longitudinal section of the capacitive in-cell touch panel provided in the embodiment of the present disclosure. As shown in FIG. 1, the capacitive in-cell touch panel provided in the embodiment of the present disclosure includes a color filter substrate 1, a thin film transistor (TFT) array substrate 2 having a common electrode layer, and a liquid crystal layer 3 between the color filter substrate 1 and the TFT array substrate 2, wherein a plurality of pixel units 4 arranged in a matrix is set on the TFT array substrate;

the color filter substrate 1 has a plurality of touch sensing electrodes 5, each of which is extended along the direction of columns of the pixel units 4;

the common electrode layer of the TFT array substrate 2 has a plurality of touch driving electrodes 6, each of which is extended along the direction of rows of the pixel units 4; during the display period of a frame of picture, each of the touch driving electrodes 6 is used to transmit a common electrode signal and a touch scanning signal in a time division manner;

the TFT array substrate 2 has a plurality of metal driving electrodes 7, each of which is extended along the direction of rows of the pixel units 4; each of the metal driving electrodes 7 is located in a gap between two adjacent pixel units 4 and is directly electrically connected to a corresponding touch driving electrode 6.

In the above capacitive in-cell touch panel provided in the embodiment of the present disclosure, the common electrode layer being connected as a whole plane on the ITT array substrate is divided into strips to be used as touch driving electrodes, and the touch driving electrodes are driven in the time division manner so as to implement the touch function and the display function. Since the structure of the common electrode layer of the TFT array substrate is modified, no additional process is added on the basis of the existing TFT array substrate preparation process, and thus the production cost is saved and the production efficiency is improved. Moreover, since the touch function and the display function are driven in the time division manner, on one hand, the chip for implementing the display driving and the chip for implementing the touch driving can be integrated together, so that the production cost can be further reduced; on the other hand, the time division driving of the touch function and the display function can also reduce the interference between the display function and the touch function, so that picture quality and touch accuracy can be increased.

In addition, since the touch driving electrodes play a role of the common electrode layer during the display period, the respective touch driving electrodes are normally prepared by materials having higher resistance such as ITO or IZO. In the touch panel provided in the embodiment of the present disclosure, in order to reduce the resistance of the respective touch driving electrodes, the plurality of metal driving electrodes directly electrically connected with the respective touch driving electrodes is set on the TFT array substrate, so that the resistance of the touch driving electrodes are greatly reduced. Since such metal driving electrodes are located among the corresponding adjacent pixel units, the aperture region of the resultant touch panel will not be occupied and thus the aperture ratio of the touch panel can be ensured.

Detail description will be given below to the particular structure on the TFT array substrate of the above touch panel.

In a particular implementation, the common electrode layer can be divided into the touch driving electrodes 6 with appropriate width according to the required touch accuracy. In general, each of the touch driving electrodes 6 preferably has a width of 2-6 mm. Since the accuracy of the touch panel is on the order of millimeter and the accuracy of the liquid crystal screen is on the order of micrometer, the accuracy required for the display function is much higher than that required for the touch function and thus each of the touch driving electrodes 6 generally covers a plurality of rows of pixel units 4. For example, a touch driving electrode 6 shown in FIG. 1 can cover three rows of pixel units 4, but no specific definition will be made on the particular number of rows of pixel units 4 covered by one touch driving electrode 6.

In addition, in a particular implementation, since the accuracy required for the display function is much higher than that required for the touch function, it is possible that not all the strip electrodes into which the common electrode layer is divided function as the touch driving electrodes, and that some strip electrodes only function as the common electrodes. That is, besides the touch driving electrodes, the common electrode layer also has the common electrodes being insulated from the touch driving electrodes, and at least one common electrode is arranged between two adjacent touch driving electrodes.

Generally, on the array substrate of the traditional ADS liquid crystal panel, the common electrodes implemented as a plate electrode are located on a lower layer (i.e. closer to the supporting base of the array substrate), the pixel electrodes implemented as slit electrodes are located on a upper layer (i.e. closer to the liquid crystal layer), and an insulating layer is arranged between the pixel electrodes and the common electrodes. On the array substrate of the HADS liquid crystal panel, the pixel electrodes implemented as a plate electrode are located on a lower layer (i.e. closer to the supporting base of the array substrate), the common electrodes implemented as slit electrodes are located on a upper layer (i.e. closer to the liquid crystal layer), and an isolation layer is arranged between the pixel electrode and the common electrode.

Figure 2:
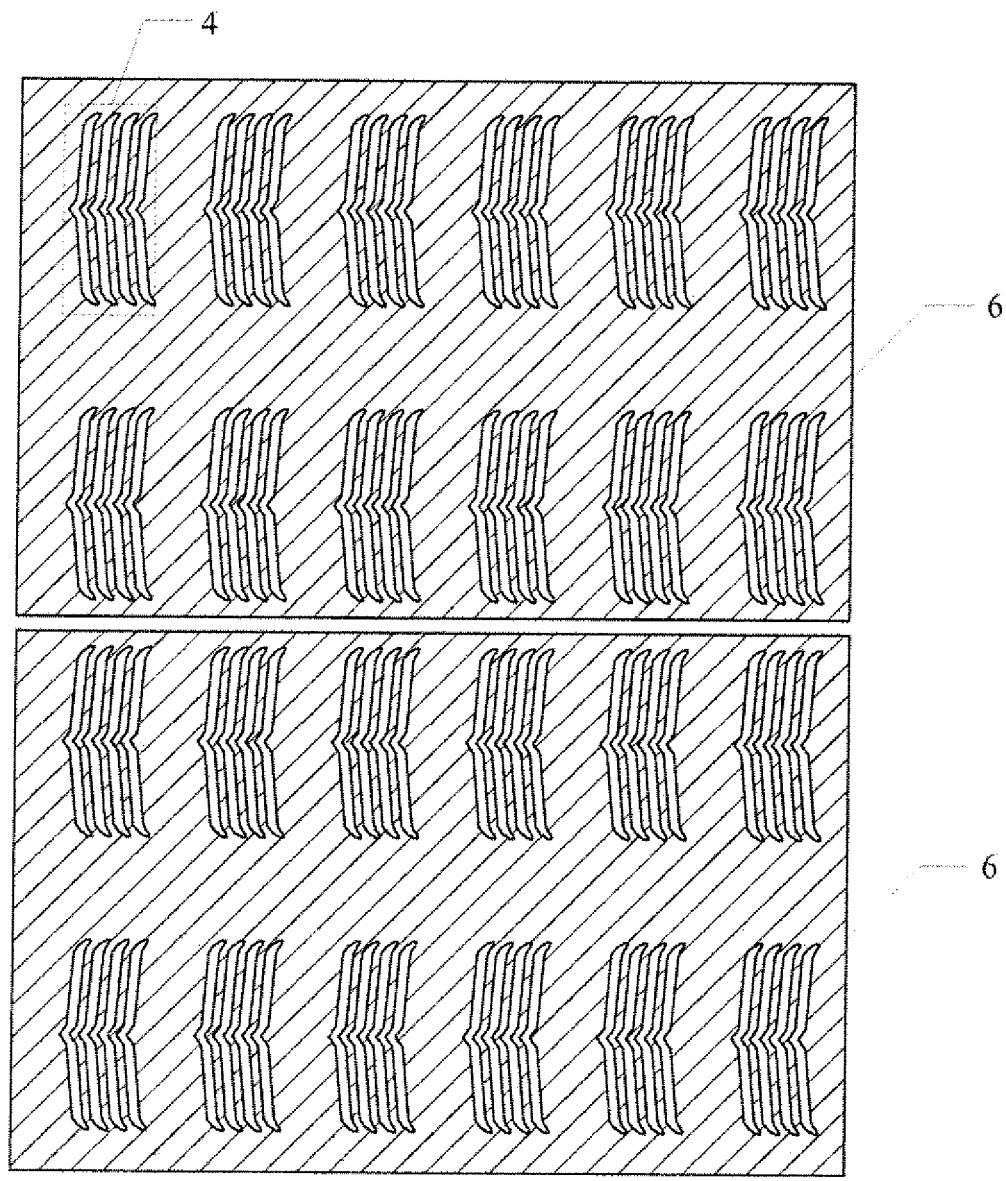
FIG. 2 is a schematic pattern diagram of touch driving electrodes provided in the embodiment of the present disclosure.

Particularly, according to the type of the liquid crystal panel to which the above touch panel is applied, the respective touch driving electrodes 6 and the common electrodes forming the common electrode layer may have a slit-shaped ITO electrode structure or a plate-shaped ITO electrode structure at the position corresponding to the aperture region of the pixel units 4. That is, for the HADS type as shown in FIG. 2, the respective touch driving strip electrodes 6 are formed by the slit-shaped ITO electrodes; particularly, the slit-shaped ITO electrode structure is a structure wherein there are slit ITO electrodes corresponding to the aperture region of the pixels. For the ADS type, the respective touch driving strip electrodes 6 are formed by the plate-shaped ITO electrodes so as to meet the requirement of liquid crystal display, and in this case, induction capacitors are formed between the touch driving electrodes 6 through the slit region of the pixel electrodes and the touch sensing electrode 5 on the color filter substrate. Since the particular structures of the ADS liquid crystal panel and the HADS liquid crystal panel belong to the common knowledge in the art, detail descriptions for such structures will be omitted.

In order to reduce the interference of other signals, such as electrical signals on gate signal lines, data signal lines or pixel electrodes, in the electrical signal transmitted on the touch driving electrode, the common electrode layer formed by the respective touch driving electrodes 6 and the common electrodes is arranged above the pixel electrodes on the TFT array substrate, that is, the HADS type is adopted, such that the interference in the signal of the touch driving electrode 6 caused by other signals can be reduced as much as possible.

Furthermore, in order to reduce capacitances between the touch driving electrodes on the common electrode layer and the gate signal lines or the data signal lines below the touch driving electrodes, as shown in FIG. 1, a resin material insulating layer 8 can be set between the common electrode layer and the data signal lines in the TFT array substrate to replace an existing SiNx material insulating layer, since the dielectric constant of the resin material is smaller than that of the SiNx material. In addition, the thickness of the resin material insulating layer 8 can also be increased to reduce the capacitances between the touch driving electrodes and the data signal lines or the gate signal lines, so that the interference of the electrical signal supplied to the touch driving electrodes in the display can be reduced.

Figure 3:
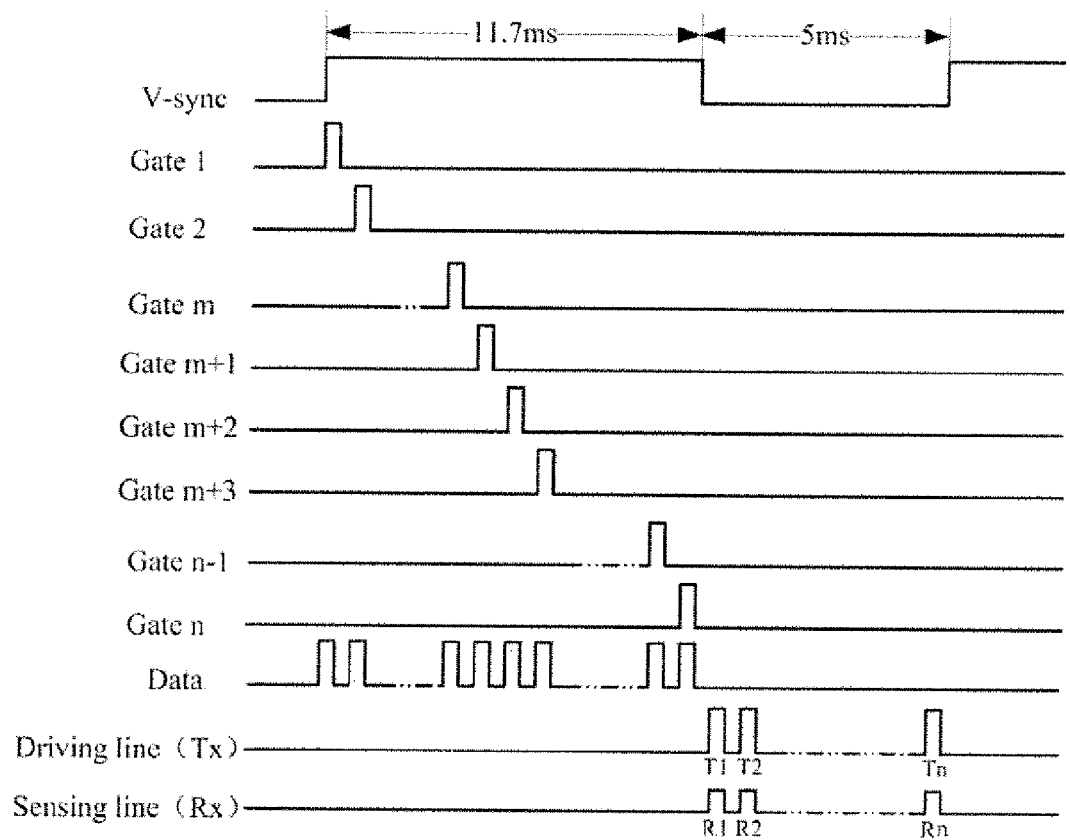
FIG. 3 is a schematic timing sequence diagram for driving the touch panel provided in the embodiment of the present disclosure.

Particularly, the touch driving electrodes 6 in the above touch panel provided in the embodiment of the present disclosure not only support the touch function but also support the display function, so a time division driving scheme is required on the touch driving electrodes 6. For example, in a driving timing sequence diagram as shown in FIG. 3, a first 11.7 ms in a frame (V-sync) can be used for the liquid crystal display, during which Gate 1, . . . , Gate n are scanned progressively and the touch driving electrodes are used as the common electrodes at this time accordingly, an IC chip connected to the touch driving electrodes supplies a constant common electrode signal to the touch driving electrodes for implementing the liquid crystal display function; the last 5 ms in the frame can be used for the touch detection, during which the IC chip connected to the touch driving electrodes supplies touch scanning signals T1, T2, . . . , Tn to the individual touch driving electrodes respectively, and the respective touch sensing electrodes detect touch sensing signals R1, R2, . . . , Rn respectively for implementing the touch function. The above only gives an exemplary time ratio for the display driving and the touch driving in a particular frame, and the time ratio can be set according to the frequency of the IC chip providing signals and is not limited herein.

The driving timing sequence diagram shown in FIG. 3 only gives an exemplary case of time division driving scheme. In addition, for example, the time for liquid crystal displaying can be set as 12.7 ms and the time for touch driving can be set as 4 ms.

In the touch panel provided in the embodiment of the present disclosure, the metal driving electrodes directly electrically connected to the corresponding touch driving electrodes are set on the TFT array substrate so as to reduce resistance of the touch driving electrodes. In a particular implementation, the metal driving electrodes can be arranged in a layer above the touch driving electrodes, and can be arranged in a layer below the touch driving electrodes as shown in FIG. 1, and also can be arranged simultaneously in a layer above the touch driving electrodes and in a layer below the touch driving electrodes, the particular position of the metal driving electrodes is not limited herein. The metal driving electrodes directly electrically connected to the corresponding touch driving electrodes are prepared by a separate patterning process, arranging the metal driving electrodes in both the layer above the touch driving electrodes and the layer below the touch driving electrodes may bring about increase of the preparation process although it may reduce their resistances to the maximum extent. Therefore, the number of layer(s) and the position of layer(s) of the touch driving electrodes to be prepared can be selected according to actual requirements.

Particularly, the metal driving electrodes should be arranged in a region corresponding to a black matrix, that is, in gaps between the adjacent pixel units, since material constituting the metal driving electrodes is a nontransparent metal. Particularly, the respective metal driving electrodes 7 include at least one horizontal metal sub-electrode 71 and/or at least one vertical metal sub-electrode 72. Taking FIG. 4 as an example, the respective metal driving electrodes 7 include one horizontal metal sub-electrode 71 and a plurality of vertical metal sub-electrodes 72, in the region covered by the touch driving electrodes 6 corresponding to the metal driving electrodes 7, the horizontal metal sub-electrode 71 is particularly located at the gaps between the adjacent rows of pixel units, and the vertical metal sub-electrodes 72 are particularly located at the gaps between the adjacent columns of pixel units. In a particular implementation, the number of the horizontal metal sub-electrode 71 and the vertical metal sub-electrode 72 in the metal driving electrodes can be set according to the resistance as required, and is not limited herein.

Figure 4:
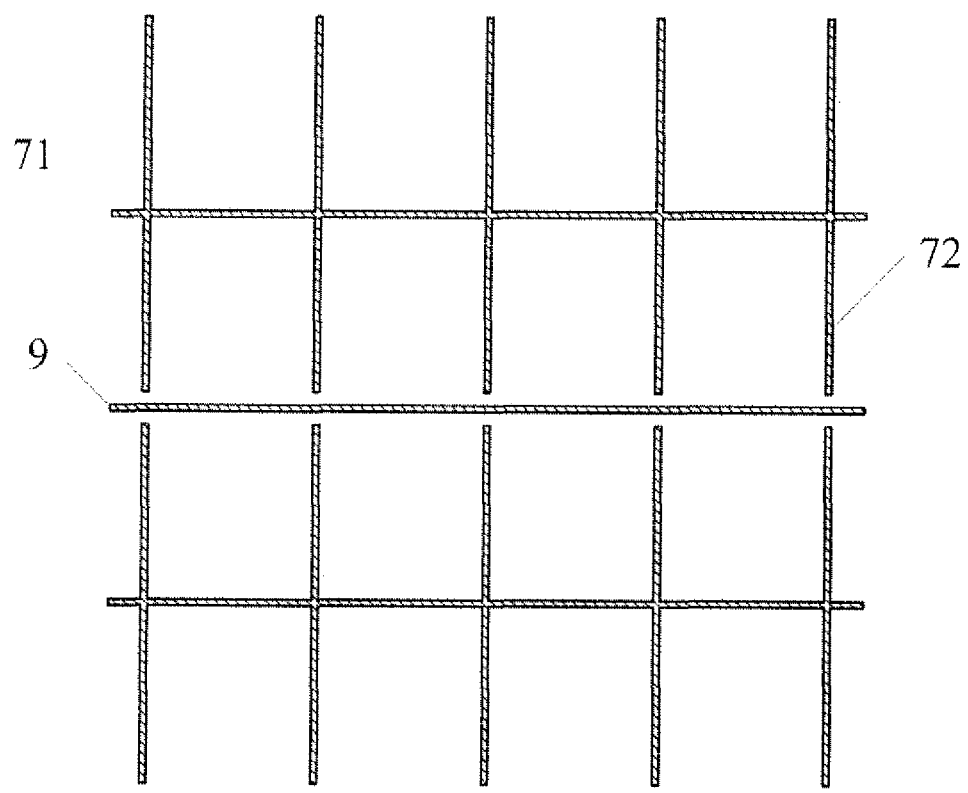
FIG. 4 is a schematic pattern diagram of metal driving electrodes provided in the embodiment of the present disclosure.

Furthermore, since the common electrode layer is divided into a plurality of touch driving electrodes, when a common electrode signal is supplied to the respective touch driving electrodes during the display period, the voltage at a position where the common electrode layer is divided is unstable relative to the voltage at a position where no division occurs on the common electrode layer, which will affect the normal deflection of the liquid crystal molecules. Therefore, in order to solve such problem, as shown in FIG. 4, metal dummy electrodes 9 are arranged in the same layer as the metal driving electrodes, the metal dummy electrodes 9 are located at the gaps between the adjacent touch driving electrodes 6 and are insulated from the metal driving electrodes, for transmitting the common electrode signal so as to compensate the common electrode signal at the gaps where the common electrode layer 6 is divided, wherein the metal dummy electrodes 9 and the adjacent pixel electrodes 4 produce an electrical field to ensure the normal deflection of the liquid crystal molecules.

Detail descriptions will be given below to the signal supplying manner of the respective touch driving electrodes 6 in the common electrode layer of the above touch panel.

In a particular implementation, since the common electrode layer is divided into a plurality of touch driving electrodes 6, each of which is extended along the direction of rows of the pixel units 4, signal lines corresponding to the respective touch driving electrodes 6 can be arranged at the peripheral location of the TFT array substrate, and can be supplied with corresponding electric signals when the touch function and the display function are implemented respectively. In the above signal supplying manner, the electric signals are supplied to the touch driving electrodes 6 at the peripheral location of the TFT array substrate, it is easy to cause a problem that signals transmitted on the touch driving electrodes 6 are unstable when such a signal supplying manner is applied to a large size touch panel. In order to ensure the stability of the signal transmitted in a large size touch panel, metal signal lines corresponding to the respective touch driving electrodes 6 can be separately arranged on the TFT array substrate for implementing the function of inputting signals to the respective touch driving electrodes 6. However, such a separate arrangement of the metal signal lines will occupy a part of the display region of the liquid crystal display screen, and thus renders the aperture ratio being reduced.

Figure 5:
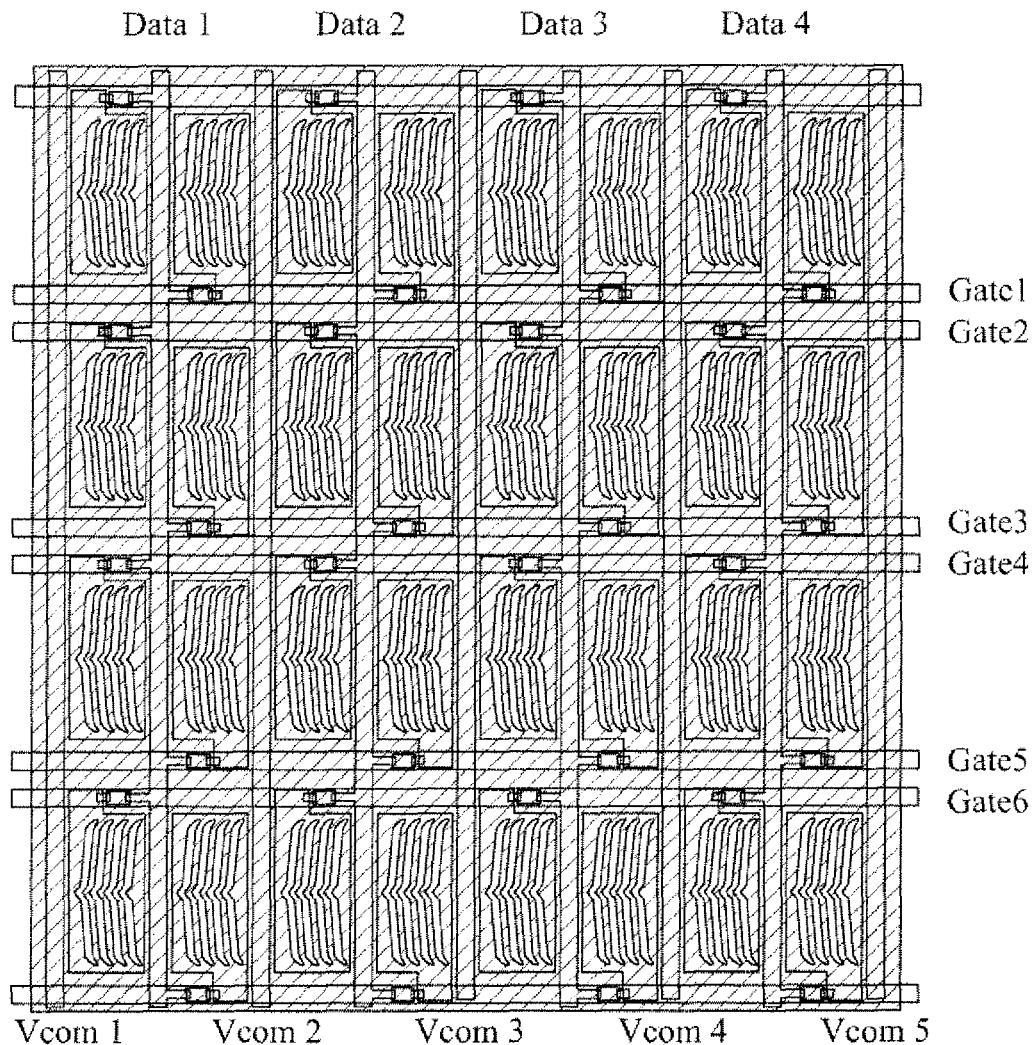
FIG. 5 is a schematic structure diagram of a dual-gate structure in a display panel in the prior art.

Preferably, in order to make the electric signals on the touch driving electrodes 6 stable as much as possible while ensuring the aperture ratio of the large size touch display screen to the maximum extent, the pixel structure in the TFT array substrate of the touch panel provided in the embodiment of the present disclosure can adopt a dual gate structure in a particular implementation. As shown in FIG. 5, in the dual gate structure, two gate signal lines are arranged between two adjacent rows of pixel units on the TFT array substrate, for example, (Gate 1, Gate 2), (Gate 3, Gate 4), (Gate 5, Gate 6); in addition, two adjacent columns of pixel units constitute a group and commonly use a data signal line between the two adjacent columns of pixel units, for example, Data 1, Data 2, Data 3 or Data 4. Actually, in the dual gate structure, position of a part of data signal lines can be saved at the cost of doubling the number of the gate signal lines.

Figure 6:
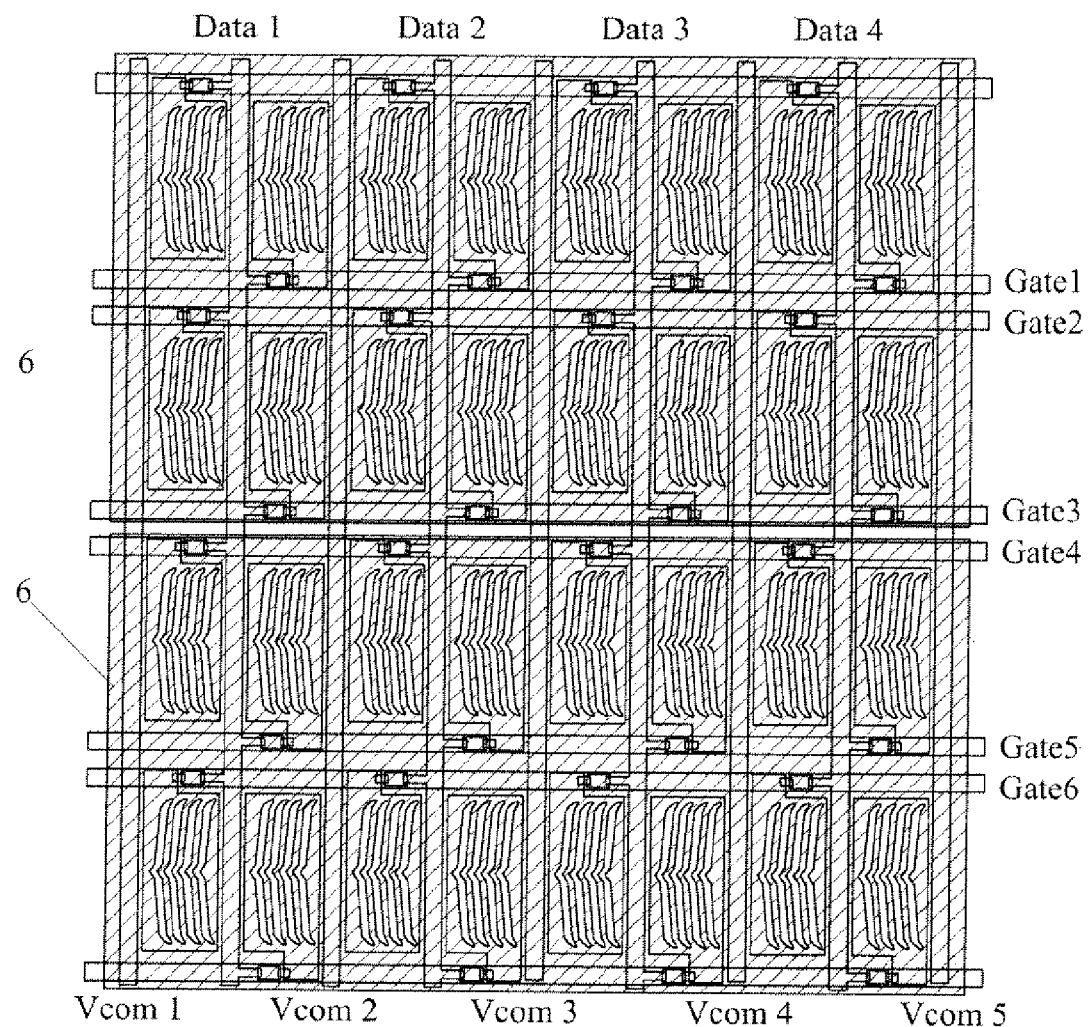
FIG. 6 is a schematic structure diagram of a TFT array substrate adopting the dual-gate structure provided in the embodiment of the present disclosure.

Furthermore, in the dual gate structure, positions of a part of data signal lines can be saved at the cost of doubling the number of the gate signal lines. As shown in FIG. 6, the common electrode signal lines can be set at the positions of the data signal lines saved, that is, the common electrode signal lines Vcom1, Vcom2, Vcom3, Vcom4 and Vcom5, which are arranged in a same layer as the data signal lines Data 1, Data 2, Data 3 and Data 4, can be arranged at some of the gaps between the adjacent groups of pixel units. These common electrode signal lines are electrically connected to the corresponding touch driving electrodes 6 through via-holes respectively so as to input the electric signals to the corresponding touch driving electrodes 6, such that the electric signals on the touch driving electrodes 6 can be stable as much as possible while the aperture ratio of the touch display screen is ensured to the maximum extent.

Figure 7:
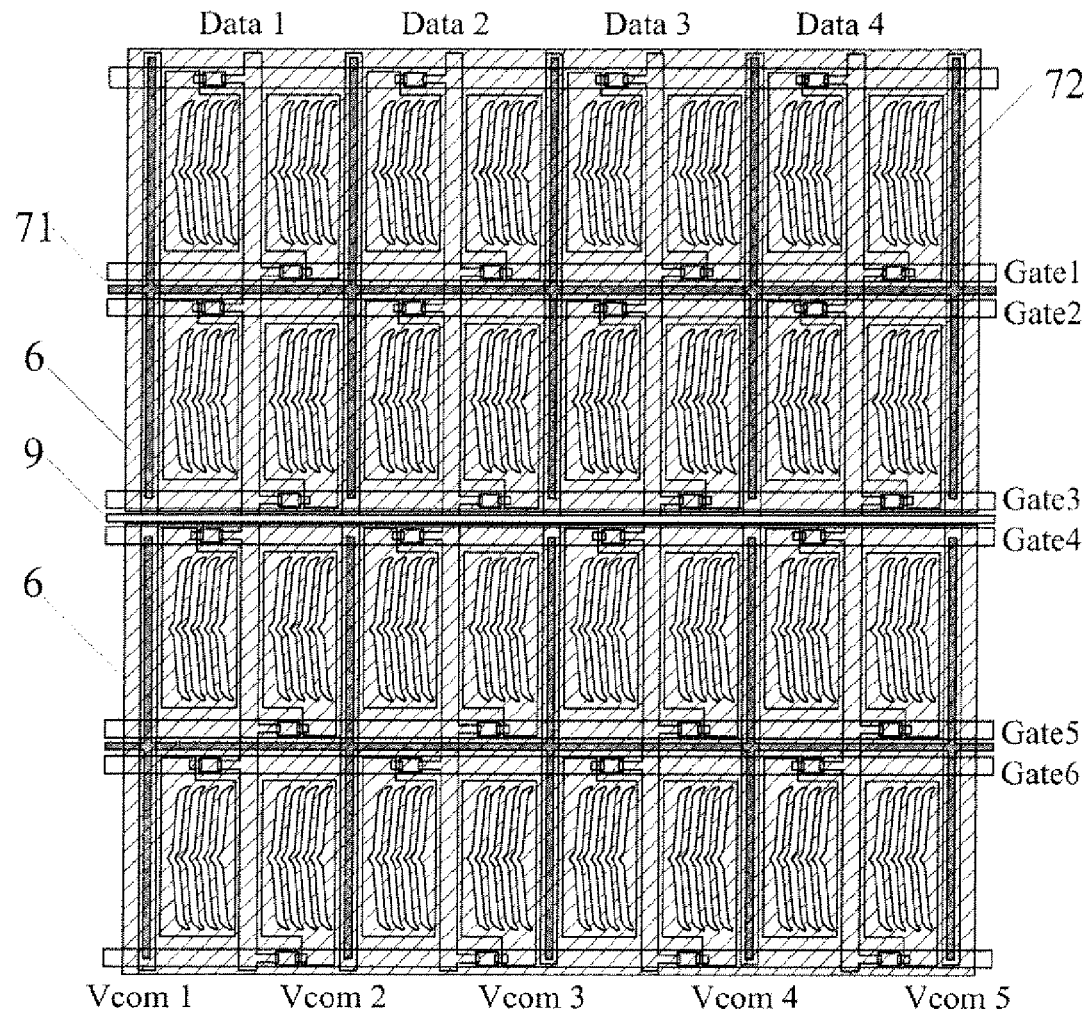
FIG. 7 is a schematic structure diagram of another TFT array substrate adopting the dual-gate structure provided in the embodiment of the present disclosure.

Furthermore, when the dual gate structure is applied to the above touch panel provided in the embodiment of the present disclosure, as shown in FIG. 7, there is a space area reserved between the two gate signal lines located between two adjacent rows of pixel units, for example, between Gate 1 and Gate 2, between Gate 3 and Gate 4, between Gate 5 and Gate 6, so as to prevent a short circuit from occurring. As such, when the metal driving electrodes are arranged, the horizontal metal sub-electrodes 71 of the metal driving electrodes 7 can be set to face over against the space area, such that when a touch driving electrode 6 transmit a touch signal, the horizontal metal sub-electrode 71 connected to the touch driving electrode 6 will not generate any interference on the display of the touch panel since it does not face over against the two adjacent gate signal lines, for example. Gate 1 and Gate 2, Gate 3 and Gate 4, Gate 5 and Gate 6. Similarly, the vertical metal sub-electrodes 72 of the metal driving electrodes 7 can be arranged only between adjacent columns of pixel units where no data signal line Data 1, Data 2, Data 3 or Data 4 is set, that is, the vertical metal sub-electrodes 72 can be arranged in a region corresponding to the region where the common electrode signal lines Vcom1, Vcom2, Vcom3. Vcom4 and Vcom5 are set, such that the interference between the data signal lines Data1, Data 2, Data3 and Data 4 and the vertical metal sub-electrodes 72 can also be reduced.

Detail description will be given below to a particular structure of a touch sensing electrodes on the color filter substrate in the above touch panel.

In a particular implementation, the touch sensing electrode 5 on the color filter substrate 1 can be particularly located between the supporting base of the color filter substrate 1 and the color resin layer of the color filter substrate 1, and can also be particularly located on one side of the color resin layer of the color filter substrate 1 facing the liquid crystal layer 3.

Figure 8:
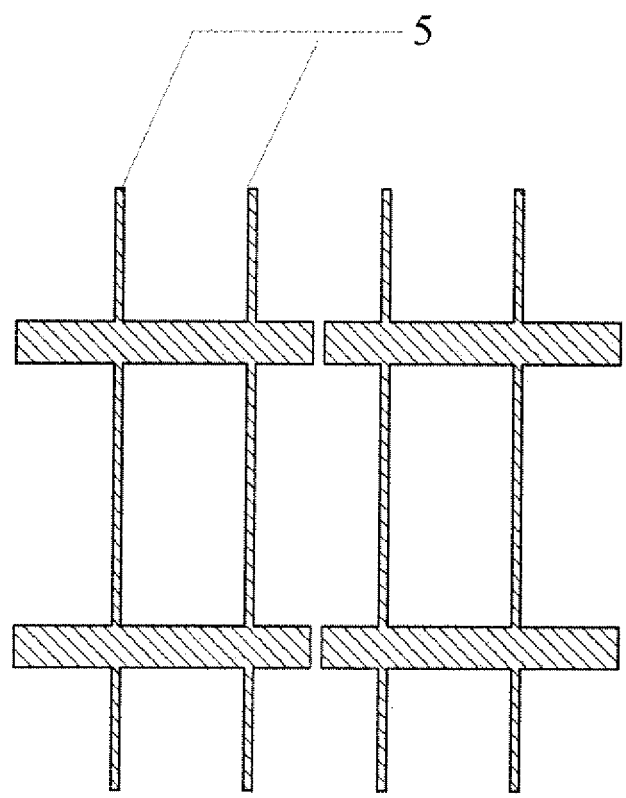
FIG. 8 is a schematic pattern diagram of touch driving electrodes provided in the embodiment of the present disclosure.

Particularly, each of the touch sensing strip electrodes 5 can include at least one vertical sensing sub-electrode. For example, as shown in FIG. 8, each of the touch sensing electrodes 5 includes two vertical sensing sub-electrodes. In order to avoid affecting the aperture ratio of the touch panel, the touch sensing electrodes 5 are generally arranged in the region on the color filter substrate 1 which is covered by the black matrix; therefore each of the vertical sensing sub-electrodes has a projection on the TFT array substrate 2 which is located between the adjacent columns of pixel units 4, that is, the vertical sensing sub-electrode corresponds to the data signal line on the TFT array substrate 2.

Furthermore, each of the touch sensing electrodes 5 can also include at least one horizontal sensing sub-electrode which is connected to the respective vertical sensing sub-electrodes of the same touch sensing electrode 5, that is, the respective vertical sensing sub-electrodes in the same touch sensing electrode are connected to each other by the horizontal sensing sub-electrode. In order to avoid affecting the aperture ration of the touch panel, each of the horizontal sensing sub-electrodes has a projection on the TFT array substrate 2 which is located in a region where the gate signal line is arranged between the adjacent rows of pixel units 4, that is, the horizontal sensing sub-electrode corresponds to the two adjacent gate signal lines on the TFT array substrate 2. The horizontal sensing sub-electrodes set in each of the touch sensing electrodes 5 can increase a mutual capacitance between the touch driving electrode 6 and the touch sensing electrode 5, which is helpful for detecting the touch signal by the touch sensing electrode 5.

In a particular implementation, width of each of the touch sensing electrodes 5 can be set according to the required touch accuracy, and the number and the density of the horizontal sensing sub-electrodes and the vertical sensing sub-electrodes included in each of the touch sensing electrodes 5 can also be set according to the required touch accuracy, detail description will be omitted.

Figure 9:
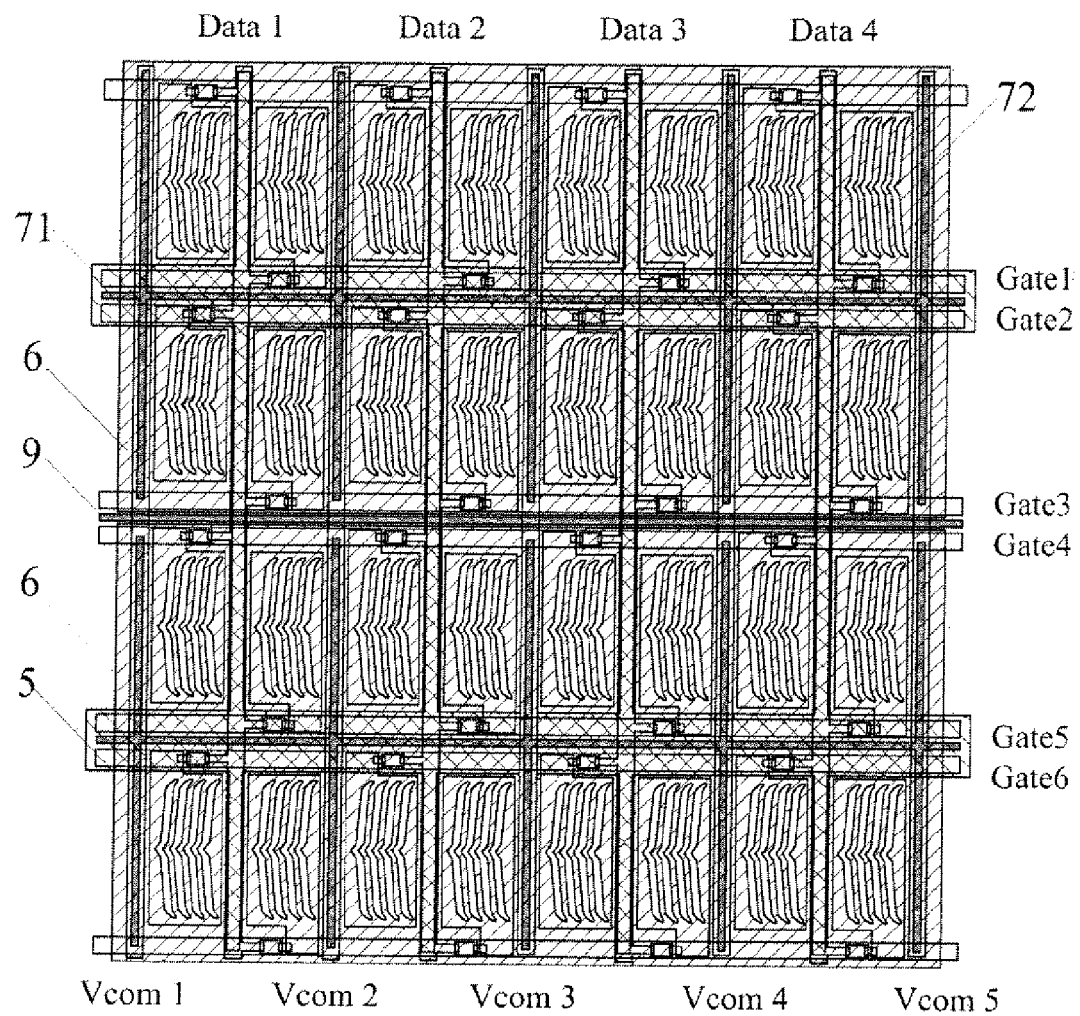
FIG. 9 is a schematic pattern diagram of a liquid crystal cell formed by the color filter substrate and the TFT array substrate provided in the embodiment of the present disclosure.

FIG. 9 shows a schematic diagram wherein the color filter substrate 1 and the TFT array substrate 2 are combined together, since the touch sensing electrodes 5 set on the color filter substrate 1 will not shade the pixel units 4, the touch sensing electrodes 5 may particularly be ITO electrodes or metal electrodes. When the metal electrodes are adopted as touch sensing electrodes 5, the resistance thereof may be effectively reduced.

Figure 10:
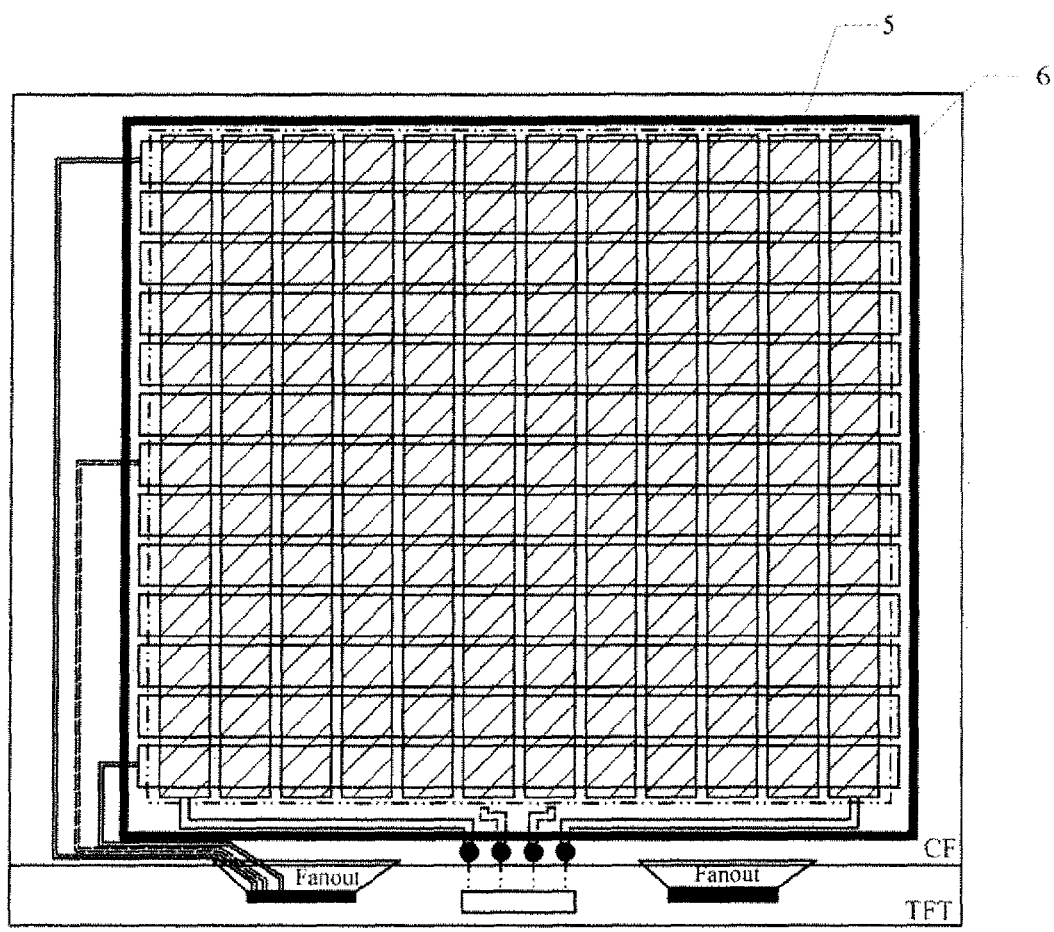
FIG. 10 is a schematic wiring diagram of the touch panel provided in the embodiment of the present disclosure.

FIG. 10 shows a schematic wiring diagram of the touch panel after a liquid crystal cell is formed, wherein for the purpose of diagram clarity, each of the respective touch sensing electrodes 5 is drawn as a strip electrode, but its actual structure can be similar to the grid structure as shown in FIG. 6. As shown in FIG. 10, mutual capacitance Cm is formed between the touch sensing electrode 5 and the touch driving electrode 6, and the value of the mutual capacitance Cm can be tuned by adjusting the density of the touch sensing electrodes 5 and the touch driving electrodes 6.

Based on the same inventive concept, another embodiment of the present disclosure further provides a display apparatus including the capacitive in-cell touch panel provided in the above embodiment of the present disclosure. For implementations of the display apparatus, please refer to the embodiment of the above capacitive in-cell touch panel, repeated description will be omitted.

With the capacitive in-cell touch panel and the display apparatus provided in the embodiments of the present disclosure, the touch sensing electrodes are set on the color filter substrate, the common electrode layer connected as a whole plane on the existing TFT array substrate is divided into strips to be used as touch driving electrodes, and the metal driving electrodes directly electrically connected to the corresponding touch driving electrodes are set on the TFT array substrate so as to reduce resistance of the touch driving electrodes, and the touch driving electrodes are driven in the time division manner, so that the touch function and the display function are implemented. In the touch panel provided in the embodiment of the present disclosure, since the structure of the common electrode layer of the existing TFT array substrate is modified to form the touch driving electrodes, no additional process is added on the basis of the existing TFT array substrate preparation process, and thus the production cost is saved and the production efficiency is improved. Moreover, since the touch function and the display function are driven in the time division manner, on one hand, the chip for implementing the display driving and the chip for implementing the touch driving can be integrated together, so that the production cost can be further reduced; on the other hand, the time division driving of the touch function and the display function can also reduce the interference between the display function and the touch function, so that picture quality and touch accuracy can be enhanced.

The above descriptions are only for illustrating the embodiments of the present disclosure, and in no way limit the scope of the present disclosure. It will be obvious that those skilled in the art may make modifications, variations and equivalences to the above embodiments without departing from the spirit and scope of the present disclosure as defined by the following claims. Such variations and modifications are intended to be included within the spirit and scope of the present disclosure.

What is claimed is:

1. A capacitive in-cell touch panel including: a color filter substrate, a thin film transistor (TFT) array substrate having a common electrode layer, and a liquid crystal layer between the color filter substrate and the TFT array substrate, wherein a plurality of pixel units arranged in a matrix are arranged on the TFT array substrate; wherein, the common electrode layer is divided into a plurality of touch driving electrodes and common electrodes extending along a direction of row of the pixel units, the common electrodes are insulated from the touch driving electrodes and at least one common electrode is arranged between two adjacent touch driving electrodes;

the color filter substrate has a plurality of touch sensing electrodes, each of which is extended along the direction of columns of the pixel units;

during a display period of a frame of picture, each of the touch driving electrodes is used to transmit a common electrode signal and a touch scanning signal in a time division manner, and the common electrode only transmits the common electrode signal;

the TFT array substrate has a plurality of metal driving electrodes, each of which is extended along the direction of rows of the pixel units; each of the metal driving electrodes is located in a gap between adjacent pixel units and is directly electrically connected to a corresponding touch driving electrode.

2. The touch panel of claim 1, wherein each of the touch driving electrodes covers a plurality of pixel units.

3. The touch panel of claim 2, wherein the metal driving electrodes are located in a layer positioning at least one of: (1) above the touch driving electrodes and (2) below the touch driving electrodes.

4. The touch panel of claim 3, wherein each of the metal driving electrodes includes at least one horizontal metal sub-electrode and at least one vertical metal sub-electrode;

in the region covered by the touch driving electrode corresponding to the metal driving electrode, the horizontal metal sub-electrode is located at a gap between adjacent rows of pixel units, and the vertical metal sub-electrode is located at a gap between adjacent columns of pixel units.

5. The touch panel of claim 4, further including metal dummy electrodes arranged in a same layer as the metal driving electrodes, wherein the metal dummy electrodes are located at the gaps between adjacent touch driving electrodes, and are used for transmitting the common electrode signal.

6. The touch panel of claim 1, wherein two gate signal lines are arranged between adjacent rows of pixel units on the TFT array substrate, and two adjacent columns of pixel units belong to a group of pixel units and commonly use a same data signal line between the two adjacent columns of pixel units.

7. The touch panel of claim 6, wherein the common electrode signal lines arranged in a same layer as the data signal lines are arranged at gaps between adjacent groups of pixel units; and the common electrode signal lines are electrically connected to the corresponding touch driving electrodes through via-holes respectively.

8. The touch panel of claim 1, wherein each of the touch driving electrodes or the common electrodes has a slit-shaped ITO electrode structure at the position corresponding to the aperture region of the pixel unit, and the touch driving electrode and the common electrode are located above the pixel electrodes in the TFT array substrate.

9. The touch panel of claim 8, wherein a resin material insulating layer is set between the common electrode layer and the data signal lines in the TFT array substrate.

10. The touch panel of claim 1, wherein the touch sensing electrodes are located between a supporting base of the color filter substrate and a color resin layer of the color filter substrate, or are located on one side of the color resin layer of the color filter substrate facing the liquid crystal layer.

11. The touch panel of claim 10, wherein each of the touch sensing electrodes includes at least one vertical sensing sub-electrode, and the at least one vertical sensing sub-electrode has a projection on the TFT array substrate which is located between adjacent columns of pixel units.

12. The touch panel of claim 11, wherein each of the touch sensing electrodes further includes at least one horizontal sensing sub-electrode, and the at least one horizontal sensing sub-electrodes has a projection on the TFT array substrate which is located between adjacent rows of pixel units, and the respective vertical sensing sub-electrodes in the same sensing electrode are connected to each other by the horizontal sensing sub-electrodes.

13. The touch panel of claim 11, wherein the touch sensing electrodes are transparent conductive Oxide electrodes or metal electrodes.

14. A display apparatus including the capacitive in-cell touch panel of claim 1.

* * * * *